Sept. 8, 1931.  H. J. MURRAY  1,822,107
CONE TYPE SYNCHRONIZER
Filed July 12, 1926
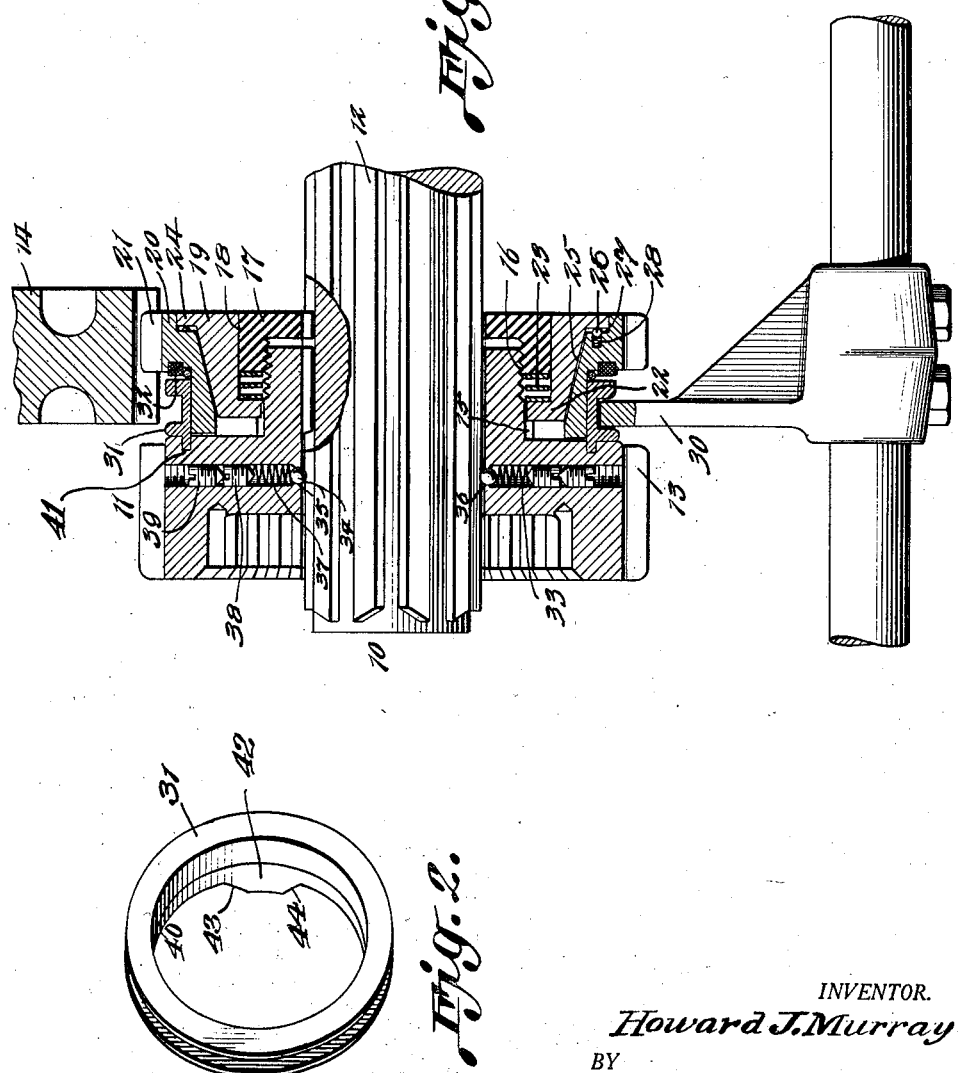
INVENTOR.
Howard J. Murray
BY
Warren S. Orton.
ATTORNEY.

Patented Sept. 8, 1931

1,822,107

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

CONE GEAR SYNCHRONIZER

Application filed July 12, 1926. Serial No. 121,887.

The invention relates to a synchronizing device for causing a pair of gears or other power transmitting members to approach the same speed just prior to being moved into meshing or into inter-driving relation. The invention herein disclosed specifically relates to a synchronizing device for use in those situations where the gears to be synchronized are moved relative to each other along parallel and offset axes of rotation and as an illustration of one situation where a synchronizer of this character is particularly effective, the invention will be described in connection with the coupling of a power shaft, which may be the propeller shaft, with the jack shaft of a multiple speed transmission mechanism in an automotive vehicle structure.

The invention herein disclosed is an improvement in the device disclosed in application Serial No. 48,559 filed August 6, 1925, and is a companion case with Patent No. 1,738,788, of December 10, 1929.

In the showing in the above identified earlier application there was disclosed a sliding gear rotatably mounted on which was a synchronizing gear and disposed between which gears was a multiple disc clutch movable into clutching position by the action of a shifter fork which bears either directly on the synchronizer or which acts on the synchronizer through the agency of a camming ring by means of which the force to effect the clutching action is derived from the rotative force of the shiftable gear.

The primary object of the present invention is to provide a simplified form of synchronizing device of the type outlined; which will retain the advantages inherent in the above outlined structure and which will, at the same time, provide a powerfully acting clutching effect without the necessity of using the multiplicity of parts characterizing the multiple disc type of clutch illustrated in these pending applications.

Broadly, this phase of the invention is attained by substituting for the multiple disc form of clutch heretofore used, a conical form of clutch particularly designed to withstand the severe usage to which such a device is put when installed as part of a variable speed gear transmission in heavy or high speed vehicles.

These devices depend for their proper functioning upon an initial restraint of the shiftable gear unit as a whole as it is slidably moved on its carrying shaft before the gear unit is moved into its intermeshing relation with its coacting gear. It is, therefore, necessary that some form of slip clutch connection be provided between the gear unit and the shaft on which it is mounted to restrain the normal freedom of axial movement. Heretofore, this has been attained either by means of a spring held cam and later by mounting a split ring in a groove formed partly in the gear unit and partly in the shaft. In these cases, however, it is obvious that the tension of the resilient holding means being constant the restraint to the axial movement of the gear unit is always the same. In these prior structures it was not possible to vary the intensity of engagement between the friction clutch faces before the gear unit as a whole was permitted to slide under the action of the control member which was effecting the clutching engagement.

Accordingly, another object of the present invention is to provide a simplified means for varying at will the intensity of engagement in the spring detent which holds the gear unit to the shaft and against its axial movement.

Broadly, this phase of the invention is attained by locking the gear unit to the shaft by means of plungers, preferably in the form of spheres, and which are maintained in their locking engagement by means of springs, the tension on which is adjustable by any conventional means, as by means of adjustable plugs backing the springs.

In constructions of the type herein disclosed where the actuating power is derived from mechanical sources there is the possibility that for some reason the parts may jam momentarily with resulting damage to the structure. Accordingly, another object of the invention is to provide for some flexibility in the driving connection between such source of power and the clutch and thus permit either a slippage of the parts or even an idling movement until the parts are restored to their operative status.

This object is attained in the case of the cam actuated friction clutch element by backing the relatively fixed element of the clutch with a relatively powerful spring which will normally act to hold the element fixed relative to the slidable unit of which it forms a part but which will give under the action of the cam in an emergency and permit the cam to turn idly.

Another object of the invention is to provide a sliding gear construction of the type outlined and including synchronizing means which may be assembled, substituted and adjusted thereon, without necessity of using any special tool for effecting the adjustment. This object is attained by securing the synchronizing parts in position by means of a simple splined end ring which is screwed into position to hold the synchronizer parts.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the drawings: Fig. 1 is a fragmentary view of parts of two of the power gears of the type found in transmission casings of conventional form, equipped with a preferred embodiment of the inventive features disclosed in this and in the above identified copending applications; Fig. 2 is a perspective view of the cam ring shown in Fig. 1.

In the drawings there is shown a power shaft 10 which for the purpose of this disclosure may be considered as a propeller shaft operatively connected to drive the traction wheels of an automobile and particularly designed to drive a high speed automobile or a heavy truck where there is a demand to transmit high torque forces through the transmission casing. A gear unit 11 is keyed to the shaft as by means of splines 12 so as to rotate therewith and is shiftable axially thereon as is usual in such constructions. The shiftable unit 11 includes a power gear 13 designed to mesh with a gear 14 keyed to another shaft, not shown, and which may be the jack shaft of a multiple four speed transmission gear set. In this disclosure, it is assumed that it is desired to synchronize the gears 13 and 14. The shiftable gear 13 is reduced at one end to form a hub extension, the inner part of which is splined as shown at 15 to engage the synchronizer hereinafter described, and beyond this splined portion 15 the hub extension is threaded as shown at 16. An end ring 17 engages the threaded end of the hub extension, is adjustable axially thereon for a reason hereinafter described, and its outer periphery 18 provides a cylindrical bearing surface for the synchronizer hereinafter described. The inner periphery of the end ring is splined to the shaft 12 and when installed thereon constitutes a fixed part of the gear unit 11.

The synchronizing device includes a friction clutch formed of a relatively fixed member 19 and a relatively movable member 20, the latter of which is provided on its outer periphery with teeth to form a synchronizing gear 21. The inner end of the fixed member 19 is provided with an inturned splined flange 22 which meshes with the spline 15. A relatively powerful coiled spring 23 is positioned between the flange 22 and the axially adjustable end ring 17. It will be understood that prior to mounting the unit 11 on the shaft 12 the clutch and associated parts are assembled in the positions shown and the ring 17 adjusted on the hub extension until the desired tension is obtained on the spring 23. This tension should be sufficient to resist any force acting on the friction clutch in the normal, usual operation of the device but, of course, should not be so resistant as to prevent the clutch from releasing itself in the presence of a powerful abnormal actuation as would occur should an attempt be made to mesh the gears 13 and 14 without disconnecting the engine clutch. It is obvious that in order to place the unit as a whole on the shaft it will be necessary to align the spline fingers of the gear 13 and the end ring 17.

An advantage of this construction, especially where low pitch threads are used at 16, is that it provides a means for adjusting to compensate for wear on the friction faces of the clutch. The unit can be removed from the shaft 12, the ring 17 given a turn to bring its spline fingers into alignment with the next finger circumferentially considered on the gear 13 and the unit is then replaced on the shaft. The fixed member 19 of the clutch is provided at its outer end with an outstanding flange 24 on the periphery of which is rotatably mounted the outer edge of the combined synchronizer gear and movable clutch member 20. The central portion of the inner periphery of gear 21 is formed frusto-conical to form a cone surface and coacts with a similarly designed surface formed at the periphery of the fixed member 19 to form a conical type of friction clutch 25. The synchronizer is normally held with its clutch faces disengaged by means of rollers 26 engaging in circumferentially spaced apart recess 27 formed in the flange 24 and maintained in bearing engagement by means of coiled springs 28 contained in spring pockets formed on the radial face 29 of the synchronizer.

The clutch is moved into operative position by the direct engagement of a control device including a shift fork 30 bearing against one side of the gear synchronizer, or the shift fork may be caused to ride in a groove, an actuator or camming ring 31 for causing the momentum of the gear unit 11 to effect an axial shifting of the synchronizer. One edge 40 of the camming ring 31 rides in a groove 41 formed in the side of the gear 13 and this edge is provided with one or more cams or camming projections 42 opposite ends of which are bevelled as shown at 43 and 44. These projections are normally contained in correspondingly shaped recesses formed in the bottom of the groove 41, all as is more fully disclosed in the above identified copending application and in my copending applications Serial No. 614,502, filed January 23, 1923, and Serial No. 633,610, filed April 21, 1923. In order to ensure the reseating of the camming ring independent of the action of the shifter fork there is provided a cam reseating ring 32 positioned between the ring 31 and the adjacent face of the synchronizer gear.

The gear 13 is provided with a plurality of radially extending and circumferentially spaced apart bores 33 which extend therethrough adjacent the center thereof and open into the axial bore opposite the splines 12 on the shaft 10. The splines are provided with semi-spherical depressions 34 facing these transverse bores and spherical stops 35 are contained partially in the bore and partially in the recess or depression. In order to prevent the escape of the spherical stops 35 when the unit is withdrawn from the shaft, the opening through the inner ends of the bores is constricted, preferably by peaning over the opening as shown at 36. Each of the ball stops 36 is backed by a coil spring 37 contained in the associated bore. The outer or free end of each spring is in engagement with a stop plug 38 threaded into the bore. It is obvious from this construction that any desired tension may be placed on the spring by inserting a screw driver or other suitable tool into the bore and adjusting the screw plug 38. As a precaution against accidentally untwisting of the plug a locking plug 39 is threaded into the bore back of the adjusting screw plug 38.

In operation and assuming that the manual moving of the shifter fork to the right of the showing in the drawing acts either directly or through the interposition of the camming ring to shift the synchronizer gear to the right and thus cause a friction clutching of the synchronizer gear to the sliding gear upon which it is mounted. Described more in detail, this movement of the fork will cause the ring 31 to bear on and compressing spring 28 move the combined synchronizer gear and movable element of the cone clutch into frictional engagement with the relatively fixed member 19. The continued force of the shifter fork will interpose a drag on the camming ring and the tendency of the gear unit 11 to rotate will cause a reaction between whichever of the bevelled ends 43 or 44 is in advance and the adjacent inclined ends of the recesses in which the cam 42 is contained and thus cause the shifter ring in riding out or rather partially out of its grinding groove 41 to bear with a powerful shifting action on the synchronizer member 20 and move the same into firm clutching engagement with the fixed member 19. There will thus be effected a frictional clutching of the synchronizer gear to the power gear on which it is mounted through the agency of the cone clutch, causing one of the power gears to assume the speed of the other. In the instant case the angle of the cone clutch is 30° to the axis of the shaft 12 so that the mechanical efficiency in using this type of clutch is twice that of the flat face type.

A continuation of pressure by the further actuation of the shift fork will cause the sliding gear unit to move bodily on its carrying shaft, the force being sufficient to displace the restraining stops 35 from their associated recesses in the splines 12 and against the action of their respective backing springs 37. It will be appreciated that increasing the tension on these springs will retard the shifting of the gear unit as a whole and necessitate a more powerful actuation of the clutch than would be the case where there is relatively weak tension on the springs.

Having thus described my invention, I claim:

1. In a device of the class described, the combination of a spline shaft, a gear unit slidable thereon, said unit including a power gear having a hub extension, an end ring threaded to the extension and splined to the shaft, a frusto-conical clutch including a relatively fixed member mounted on the end ring and splined to the extension, a spring between the end ring and the fixed member, a synchronizer gear constituting the movable member of said clutch and encircling said fixed member, resilient means tending to maintain the clutch members separated, a cam ring positioned between the power gear and the synchronizer gear and operatively disposed to cause the clutch to be moved into clutching position and a control fork engaging said cam ring.

2. In a device of the class described, the combination of a spline shaft, a gear unit slidable thereon, resilient means tending to restrain its freedom of axial movement on the shaft, said unit provided with a peripheral groove, a synchronizer mounted in said groove and having a slight freedom of axial movement relative to the sides of the groove, the inner periphery of said synchronizer and the bottom of the groove coacting to form a conical type of friction clutch and means engaging the synchronizer for shifting the same axially to and from its clutch engagement with the gear unit.

3. In a device of the class described, the combination of a pair of rotors, synchronizing means carried by one of the rotors for causing them to approach a common speed, said means including a synchronizer adapted to mesh with the other rotor, to turn therewith and providing the movable element of a friction clutch with the coacting relatively fixed element of the clutch carried by the rotor on which the synchronizer is mounted, mechanism for moving the synchronizer into clutching position, and a resilient stop between the fixed element of the clutch and the rotor on which it is mounted normally holding the fixed element of the clutch but permitting the same to give under the force of said mechanism.

4. In a device of the class described, a gear unit having a hub extension from one end, a relatively fixed member in the form of an end cone secured to the extension against rotary movement, capable of restrained axial movement and providing a peripheral groove therewith, said fixed member providing a conical friction face, a synchronizer in the form of a ring contained in said groove rotatably mounted on said friction face and coacting therewith to provide a friction clutch of the cone type, and means engaging the synchronizer for moving the clutch into operative position thereby to connect the synchronizer with the gear unit on which it is mounted.

5. In a device of the class described, a gear unit having a hub extension from one end, a relatively fixed member secured thereto against rotary movement and providing a peripheral groove therewith, said member providing a conical friction face, a synchronizer in the form of a ring contained in said groove, rotatably mounted on said friction face and coacting therewith to provide a friction clutch of the cone type, means engaging the synchronizer for moving the clutch into operative position thereby to connect the synchronizer with the gear unit on which it is mounted, and a backing spring positioned between the fixed member and the hub extension tending normally to hold the fixed member from axial movement but permitting the same to move under the force of said means.

6. In a device of the class described, the combination of a gear unit provided with means for mounting the same on a shaft, and providing a relatively fixed bearing surface, a synchronizer rotatably mounted on said bearing surface, movable bodily with the gear unit and having a slight freedom of axial movement thereon, said synchronizer and unit provided with clutch surfaces coacting to provide a conical type of friction clutch therebetween and having relative axial movement to and from their interengaging position and a camming ring adapted to be moved into engagement with the synchronizer to move the same into bearing engagement with said fixed bearing surface.

7. In a device of the class described, the combination of a unit provided with means for securing the same to a shaft to turn therewith and free to slide thereon, said unit provided with an outwardly facing conical surface, a rigid tooth ring form of synchronizer encircling said surface and journalled for rotary movement on the same, said synchronizer provided on its inner periphery with a conical surface adapted to coact with the surface on the unit to form a friction clutch of the cone type and an outer periphery thereof adapted to receive means for shifting the synchronizer and unit.

8. In a device of the class described, the combination of a shaft, a gear keyed thereto and slidable thereon, a synchronizer gear rotatably mounted thereon and carried thereby and control means acting through the synchronizer gear successively to move the same into operative position and to slide the first named gear on the shaft, said gears provided with clutch forming surfaces coacting to form a friction clutch of the cone type.

9. In a device of the class described, the combination of a gear, a synchronizer gear rotatably mounted thereon and carried thereby, said gears provided with clutch forming surfaces coacting to form a friction clutch of the cone type, and control means including a cam ring and a yoke fork engaging the cam ring for moving the same into an operative position, said means positioned between the gears for moving the clutch into clutching position.

10. In a device of the class described, the combination of a shiftable unit provided with a peripheral groove, a synchronizer fitted in said groove, said synchronizer and unit provided with means coacting to form a friction clutch, power means for moving the clutch into operative position, and a spring between said means and the synchronizer tending to separate them.

11. In a device of the class described, the combination of a pair of gears, synchronizing means for causing said gears to approach a common speed, said means including a pair of elements coacting to form a friction clutch, one of the elements carried by the gear on which it is mounted and the other element geared to the other gear to rotate therewith, control means engaging said last named element to move the clutch into position to connect said gears and normally inoperative safety means responsive to an abnormal actuation of said control means for rendering said connection inoperative, said safety means including a controlling spring and means for adjusting the tension on said spring thereby to vary the pressure at which the safety device will function.

12. In a device of the class described, the combination of a shiftable gear, synchronizing means carried thereby and including a friction clutch, control means for moving the clutch into operative position, and adjustable means for resetting the position of the clutch elements relative to said control means and shiftable gear thereby to compensate for wear in the clutch faces.

13. In a device of the class described, the combination of a pair of gears adapted to be moved into intergeared relation, of synchronizing means for establishing the desired speed relation between the gears before they move into said relation, said means including a pair of elements coacting to form a friction clutch, means engaging one of the elements for moving the clutch into clutching position and said element adapted to be moved into driving relation with one of the gears, and a spring backing the other element for resisting the action of said last named means thereby regulating the intensity of clutching engagement between said elements.

14. In a device of the class described, the combination of a power gear, an end ring axially adjustable thereon and provided on its external periphery with a cone surface, a synchronizer provided with a cone surface adapted to coact with the similar surface on the end ring to form a friction clutch of the cone type.

Signed at New York in the county of New York and State of New York this seventh day of July, A. D. 1926.

HOWARD J. MURRAY.